United States Patent
Takezawa et al.

(10) Patent No.: US 6,867,163 B2
(45) Date of Patent: Mar. 15, 2005

(54) METHOD FOR PRODUCING PRECIPITATE AND CATALYST

(75) Inventors: Hideyasu Takezawa, Hiroshima (JP); Toru Kuroda, Hiroshima (JP); Seiichi Kawato, Hiroshima (JP); Masanori Nitta, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 165 days.

(21) Appl. No.: 10/276,700

(22) PCT Filed: May 10, 2001

(86) PCT No.: PCT/JP01/03905

§ 371 (c)(1),
(2), (4) Date: Nov. 18, 2002

(87) PCT Pub. No.: WO01/87774

PCT Pub. Date: Nov. 22, 2001

(65) Prior Publication Data

US 2003/0171214 A1 Sep. 11, 2003

(30) Foreign Application Priority Data

May 16, 2000 (JP) ........................................ 2000-143522
May 16, 2000 (JP) ........................................ 2000-143524

(51) Int. Cl.$^7$ ................................................ B01J 23/28
(52) U.S. Cl. ........................ 502/321; 502/208; 502/209; 502/211; 502/305; 502/311; 502/317; 502/344; 502/353; 502/345; 502/325; 502/319; 502/303; 502/304; 502/324; 502/355
(58) Field of Search ................................ 502/208, 209, 502/210, 211, 305, 311, 321, 317, 344, 353, 345, 325, 319, 303, 304, 324, 355

(56) References Cited

U.S. PATENT DOCUMENTS 4,707,460 A * 11/1987 Ishii et al. ..................... 502/26
5,681,973 A * 10/1997 Hoelderich et al. ........... 556/26

FOREIGN PATENT DOCUMENTS

| DE | 32 48 600 | 7/1984 |
| DE | 44 24 625 | 1/1996 |
| JP | 63-130144 | 6/1988 |
| JP | 3-37116 | 2/1991 |
| JP | 6-287160 | 10/1994 |
| JP | 8-196908 | * 8/1996 |
| JP | 2000-26123 | 1/2000 |

OTHER PUBLICATIONS

U.S. Appl. No. 09/926,553, filed Nov. 19, 2001, Kuroda et al.

* cited by examiner

*Primary Examiner*—Christina Johnson
(74) *Attorney, Agent, or Firm*—Oblon, Spivak, McClelland, Maier & Neustadt, P.C.

(57) ABSTRACT

A molybdenum-based precipitate is prepared according to a process including the first step of forming a crude precipitate by pH adjustment to 6.5 or less in the presence of an alkali metal compound, and the second step of dissolving the crude precipitate in aqueous ammonia and forming a precipitate by pH adjustment to 6.5 or less. Then, the resulting molybdenum-based precipitate is washed with an acid aqueous solution having a pH of 6.5 or less and containing not less than 0.01 mole/L of ammonium root. Thus, a change in average particle diameter can be suppressed and good workability can be achieved, so that a molybdenum-based precipitate having a high purity and a desired average particle diameter can be obtained.

13 Claims, No Drawings

METHOD FOR PRODUCING PRECIPITATE AND CATALYST

TECHNICAL FIELD

This invention relates to a process for the preparation of precipitates containing at least molybdenum and an element A (in which A is at least one element selected from phosphorus and arsenic) (hereinafter also referred to as "molybdenum-based precipitates"). More particularly, it relates to a process for the preparation of molybdenum-based catalysts useful for various reactions.

BACKGROUND ART

Molybdenum-based precipitates are useful as raw materials for molybdenum-based solid catalysts used, for example, in the production of methyl tert-butyl ether by the etherification of isobutene and methanol, the production of methacrylic acid by the dehydrogenation of isobutyric acid, and the production of methacrylic acid by the vapor phase catalytic oxidation of methacrolein, and active investigations are being carried on for purposes of industrial production. In the prior art, a large number of propositions have been made as to the compositions of such catalysts and the preparation processes thereof. Generally, it is known that a molybdenum-based precipitate can be formed by allowing an oxoacid ion containing the element A to exist in an aqueous solution of a molybdate and acidifying the solution.

However, Conventional processes for the preparation of a molybdenum-based precipitate may fail to yield a molybdenum-based precipitate having a sufficiently high purity and a desired average particle diameter.

Moreover, most of the conventional processes for the preparation of a molybdenum-based precipitate are concerned with the preparation of a molybdenum-based precipitate containing one or two metallic elements. Few reports have been made of a process which can also be suitably applied to the preparation of a molybdenum-based precipitate containing three or more metallic elements.

On the other hand, a number of propositions have conventionally been made as to the method of washing a molybdenum-based precipitate. However, conventional methods for washing a molybdenum-based precipitate are disadvantageous in that impurities cannot be fully removed or a considerable change in average particle diameter may occurs during washing.

In particular, the average particle diameter of a molybdenum-based solid catalyst is an important factor which determines the pore distribution and other properties of the solid catalyst and hence contributes greatly to its performance such as catalytic activity and selectivity. Nevertheless, there have been few reports which disclose a method for washing a molybdenum-based precipitate efficiently while suppressing a change in the average particle diameter thereof.

Moreover, most of the conventional method for washing a molybdenum-based precipitate are concerned with the washing of a molybdenum-based precipitate containing one or two metallic elements. Few reports have been made of a method which can also be suitably applied to the washing of a molybdenum-based precipitate containing three or more metallic elements.

In view of the above-described circumstances, an object of the present invention is to provide a process which permits a molybdenum-based precipitate having a high purity and a desired average particle diameter to be conveniently prepared with good workability, and which can be suitably applied to the washing of a molybdenum-based precipitate containing three or more metallic elements.

Another object of the present invention is to suppress a change in the average particle diameter of a molybdenum-based precipitate, wash it conveniently with good workability, and thereby obtain a molybdenum-based precipitate having a high purity and a desired average particle diameter. A further object of the present invention is to wash a molybdenum-based precipitate containing three or more metallic elements in a suitable manner.

DISCLOSURE OF THE INVENTION

In order to accomplish the above objects, the present invention provides a process for the preparation of a precipitate containing at least molybdenum and an element A (in which A is at least one element of phosphorus and arsenic), the process including:

the first step of adjusting the pH of a fluid mixture containing the constituents of the precipitate to 6.5 or less in the presence of an alkali metal compound, and filtering the crude precipitate so formed; and the second step of dissolving the crude precipitate in aqueous ammonia, adjusting the pH of the resulting solution to 6.5 or less, and filtering the precipitate so formed.

It is preferable that, subsequently to at least one of the first step and the second step, at least one of the crude precipitate obtained in the first step and the precipitate obtained in the second step is washed with an acid aqueous solution having a pH of 6.5 or less and containing not less than 0.01 mole/L of ammonium root.

Moreover, the present invention provides a process for the preparation of a precipitate which includes the step of washing a precipitate containing at least molybdenum and an element A (in which A is at least one element of phosphorus and arsenic) with an acid aqueous solution, wherein the acid aqueous solution has a pH of 6.5 or less and contains not less than 0.01 mole/L of ammonium root.

Furthermore, the present invention provides a process for the preparation of a molybdenum-based catalyst represented by the following general formula (1):

$$A_a Mo_b V_c Cu_d D_e Y_f Z_g O_h \qquad (1)$$

wherein A is at least one element of phosphorus and arsenic, D is at least one element selected from the group consisting of antimony, bismuth, germanium, zirconium, tellurium, silver, selenium, silicon, tungsten and boron, Y is at least one element selected from the group consisting of iron, zinc, chromium, magnesium, tantalum, manganese, cobalt, barium, gallium, cerium and lanthanum, Z is at least one element selected from the group consisting of potassium, rubidium and cesium, a is in the range of 0.5 to 3, b is equal to 12, c is in the range of 0 to 3, d is in the range of 0 to 3, e is in the range of 0 to 3, f is in the range of 0 to 3, and h is the atomic ratio of oxygen required to meet the valence of each element, the process including:

the first step of adjusting the pH of a fluid mixture containing at least molybdenum and the element A to 6.5 or less in the presence of an alkali metal compound, and filtering the crude precipitate so formed;

the second step of dissolving the crude precipitate in aqueous ammonia, adjusting the pH of the resulting solution to 6.5 or less, and filtering the precipitate so formed; and the step of preparing the catalyst from the precipitate.

BEST MODE FOR CARRYING OUT THE INVENTION

Preferred embodiments of the present invention will be described hereinbelow.

The preparation process of the present invention includes at least a first and a second step. In the first step, a fluid mixture is prepared by dispersing a molybdenum-based in water and adding an alkali metal compound thereto. Thereafter, the pH of the resulting fluid mixture is adjusted to 6.5 or less, and the crude precipitate so formed is collected by filtration. In the second step, a solution is prepared by adding aqueous ammonia to the crude precipitate obtained in the first step and dissolving the crude precipitate therein. Thereafter, the pH of the resulting solution is adjusted to 6.5 or less, and the precipitate so formed is collected by filtration.

As a result of intensive investigations on the preparation of a molybdenum-based precipitate, the present inventors have found that the above-described process permits a molybdenum-based precipitate having a high purity and a desired average particle diameter to be conveniently prepared with good workability and, moreover, the above-described process can be suitably applied to the preparation of a molybdenum-based precipitate containing three or more metallic elements.

Although the reason therefor is not clearly known, it is presumed that, by pH adjustment to 6.5 or less in the presence of ammonium root, the desirable precipitation of a molybdenum-based compound can be achieved in a state which minimizes the embedment of impurities and the like.

No particular limitation is placed on the type of the molybdenum-based precipitate to which the present invention is applicable, so long as the precipitate contains at least molybdenum and an element A (in which A is at least one element selected from phosphorus and arsenic). Examples thereof include salts formed by the combination of a heteropolyacid having molybdenum as the coordinating element and the element A as the central element, with an element Z (in which Z is at least one element selected from the group consisting of potassium, rubidium and cesium), and mixtures containing such acids.

As the basic structures of heteropolyacids, the Keggin and Silverton structures in which the ratio of the central element to the coordinating element is 1:12, the Dawson structure in which the ratio is 2:18, the Anderson structure in which the ratio is 1:6, and the like are known. Such heteropolyacids may be prepared, for example, by acidifying an aqueous solution containing a molybdate and an oxoacid ion containing the element A so as to precipitate a heteropolyacid. In order to prepare a heteropolyacid containing the element Z, a Z salt of the heteropolyacid may readily be formed by precipitating the heteropolyacid in the presence of a Z ion produced by dissolving a compound of the element Z.

Since the molybdenum-based precipitate obtained by the preparation process of the present invention has a high purity and a desired average particle diameter, a molybdenum-based solid catalyst (also referred to as "molybdenum-based catalyst") having good characteristics may be prepared as required, for example, by adding one or more metallic elements to the molybdenum-based precipitate obtained in the present invention.

That is, a molybdenum-based catalyst may be prepared by preparing a molybdenum-based precipitate having a desired average particle diameter according to a process including the aforesaid first and second steps, and subjecting the molybdenum-based precipitate to a subsequent step for enhancing its catalytic performance (for example, adding thereto one or more metallic elements depending on the reaction system).

Examples of the molybdenum-based solid catalyst include molybdenum-based catalysts represented by the following general formula (1):

$$A_a Mo_b V_c Cu_d D_e Y_f Z_g O_h \quad (1)$$

wherein A is at least one element of phosphorus and arsenic, D is at least one element selected from the group consisting of antimony, bismuth, germanium, zirconium, tellurium, silver, selenium, silicon, tungsten and boron, Y is at least one element selected from the group consisting of iron, zinc, chromium, magnesium, tantalum, manganese, cobalt, barium, gallium, cerium and lanthanum, Z is at least one element selected from the group consisting of potassium, rubidium and cesium, a is in the range of 0.5 to 3, b is equal to 12, c is in the range of 0 to 3, d is in the range of 0 to 3, e is in the range of 0 to 3, f is in the range of 0 to 3, and h is the atomic ratio of oxygen required to meet the valence of each element.

From the viewpoint of catalytic efficiency, handleability during washing, and the like, the average particle diameter of the molybdenum-based precipitate is preferably not less than 1 $\mu$m and more preferably not less than 3 $\mu$m, and is preferably not greater than 100 $\mu$m and more preferably not greater than 70 $\mu$m.

Specific examples of the molybdenum-based catalyst include a catalyst for the production of methacrylic acid by the vapor phase catalytic oxidation of methacrolein, a catalyst for the production of methyl tert-butyl ether by the etherification of isobutene and methanol, and a catalyst for the production of methacrylic acid by the dehydrogenation of isobutyric acid.

In the first step of the above-described process for the preparation of a molybdenum-based catalyst, a molybdenum-based catalyst having been used for any of various reactions (also referred to as "used catalyst") may be used as the raw material for a molybdenum-based precipitate. In such a case, a used molybdenum-based catalyst whose activity has been reduced as a result of long-term use may be recovered, purified according to the process for the preparation of a molybdenum-based precipitate in accordance with the present invention, and then replenished with one or more necessary metallic elements. Thus, it is possible to prepare a reactivated molybdenum-based catalyst or a molybdenum-based catalyst having different reaction characteristics and other characteristics as compared with that before being recovered.

The first step of the present invention is usually carried out by dispersing a solid containing the constituents of a molybdenum-based precipitate in water and then adding an alkali metal compound thereto. Although no particular limitation is placed on the amount of water added, it should be used in such an amount as to permit the resulting mixture to be handled as a slurry. Usually, water is used in an amount of not less than 1 part by mass per part by mass of the solid containing the constituents. The amount of alkali metal compound added is preferably such that the pH of the resulting mixture will not less than 8, more preferably not less than 8.5, and not greater than 12. No particular limitation is placed on the type of the alkali metal compound used for this purpose. However, examples thereof include sodium hydroxide, potassium hydroxide, cesium hydroxide and sodium hydrogen carbonate. Among others, sodium hydroxide is preferred. The alkali metal compound may be added to the mixture, in the form of a solid or a preformed aqueous solution.

After the addition of the alkali metal compound, the mixture is preferably kept for a predetermined time in order to dissolve the metallic elements present in the solid containing the constituents of the molybdenum-based precipitate. The keeping time preferably ranges from 0.5 hour to 24 hours, and the keeping temperature preferably ranges from room temperature to 90° C. Although the mixture may be allowed to remain stationary, it is preferably kept with stirring.

Thereafter, if the mixture contains any insoluble residue, it is preferably removed by filtration or other means.

Then, the pH of this mixture is adjusted to 6.5 or less by the addition of an acid. The acids which can be added for the purpose of pH adjustment include, for example, hydrochloric acid, nitric acid and sulfuric acid. Among others, hydrochloric acid and nitric acid are preferred.

After pH adjustment, the mixture is preferably kept for a predetermined time in order to form a crude precipitate. The keeping time preferably ranges from 0.5 hour to 24 hours, and the keeping temperature preferably ranges from room temperature to 90° C. Although the mixture may be allowed to remain stationary, it is preferably kept with stirring.

On the basis of compositional analysis and X-ray diffractometry, it is presumed that the principal component of the crude precipitate thus obtained comprises, for example, a so-called Dawson-type heteropolyacid salt in which the ratio of the central element (e.g., phosphorus) to molybdenum is 2:18, or a mixture of a so-called Keggin-type heteropolyacid salt in which the ratio of the central element (e.g., phosphorus) to molybdenum is 1:12, and a Dawson-type heteropolyacid. In this case, the proportion of the Keggin-type heteropolyacid salt becomes higher as the adjusted pH is lowered.

Where the amount of the element Z is not sufficient to precipitate the heteropolyacid as a salt of the element Z, it is preferable to add a source of ammonium root prior to pH adjustment so that ammonium root will preferably be present in an amount of not less than 0.5 mole, more preferably not less than 3 moles, and not greater than 40 moles, per mole of the element A. The presence of ammonium root permits a larger amount of the heteropolyacids to be precipitated as an ammonium salt, so that the recovery of molybdenum and the element A contained in the crude precipitate can be improved. As the amount of ammonium root increases, the recovery of molybdenum and the element A becomes higher.

No particular limitation is placed on the type of the source of ammonium root, so long as it is soluble. Examples thereof include aqueous ammonia, ammonium chloride, ammonium nitrate and ammonium carbonate.

The residual fluid from which the molybdenum-based precipitate formed in the second step has been separated contains a large amount of ammonium root. Although this residual fluid may be discarded, it can be used as the source of ammonium root which is added to the mixture of the first step. This provides an economically desirable process because no additional fresh source of ammonium root is required.

Where the constituents of the precipitate include at least one element selected from the group consisting of potassium, rubidium and cesium, the at least one element selected from the group consisting of potassium, rubidium and cesium is substantially removed, if necessary, prior to the first step.

More specifically, depending on the intended use of the finally obtained molybdenum-based precipitate, it may be desirable that the element Z is present in small amounts or completely absent. In such a case, it is preferable to remove all or part of the element Z from the mixture prior to its pH adjustment to 6.5 or less. This may be accomplished, for example, by causing Z ions to become adsorbed to a cation-exchange resin. The removal of the element Z is preferably carried out prior to pH adjustment to 6.5 or less. In this case, it is especially preferable to add ammonium root so as to recover molybdenum and the element A efficiently.

The crude precipitate formed by pH adjustment is separated from the residual fluid by a suitable solid-liquid separation technique. No particular limitation is placed on the solid-liquid separation technique employed, and any common techniques such as filtration and centrifugation may be employed. For this purpose, there may be used any of various common apparatus such as pressure filters, vacuum filters, filter presses and centrifugal separators.

In the second step, the crude precipitate obtained in the above-described manner is redissolved by adding aqueous ammonia thereto. Then, a precipitate is formed again by adding an acid so as to adjust the pH of the solution to 6.5 or less. No particular limitation is placed on the state of the crude precipitate to which aqueous ammonia is added, and the crude precipitate may be either in a dry state or in a wet state.

The amount of aqueous ammonia added may be such that it can dissolve the crude precipitate. However, it is preferable to add aqueous ammonia in such an amount as to give a pH of 8 or greater. Aqueous ammonia may be added directly to the crude precipitate. Alternatively, it is possible to disperse the crude precipitate in water and then add aqueous ammonia thereto. The acid used for the purpose of pH adjustment may be the same as that used in the first step, or may be different therefrom. This acid may be selected according to the intended use of the molybdenum-based precipitate. After pH adjustment, the solution is preferably kept for a period of time ranging from 0.5 hour to 24 hours. The keeping temperature preferably ranges from room temperature to 90° C. Moreover, the solution is preferably kept with stirring.

Similarly to the first step, the precipitate formed in the second step is separated from the residual fluid by a suitable solid-liquid separation technique.

Subsequently to the first step, the crude precipitate obtained in the first step is preferably washed with an acid aqueous solution having a pH of 6.5 or less and containing not less than 0.01 mole/L of ammonium root.

Moreover, subsequently to the second step, the precipitate obtained in the second step is preferably washed with an acid aqueous solution having a pH of 6.5 or less and containing not less than 0.01 mole/L of ammonium root.

By employing this washing method, a change in the average particle diameter of the molybdenum-based precipitate during washing can be suppressed, and the molybdenum-based precipitate can be conveniently washed with good workability without causing any significant alteration in the solid-liquid separation properties of the washing fluid and the precipitate. Thus, there can be obtained a molybdenum-based precipitate having a desired average particle diameter. Moreover, there can be obtained a molybdenum-based precipitate having a sufficiently high purity. Furthermore, even a molybdenum-based precipitate containing three or more metallic elements may also be conveniently be washed with good workability.

In order to suppress a change in the average particle diameter of the molybdenum-based precipitate during washing to a full degree, the concentration of ammonium root in the acid aqueous solution should preferably be not less than 0.01 mole/L, more preferably not less than 0.05 mole/L, and most preferably not less than 0.1 mole/L.

The impurities contained in the molybdenum-based crude precipitate and precipitate include, for example, excess ammonium root and nitrate root, chlorine, sulfur, salts formed from the alkali metal compound added and the acid used for pH adjustment. The components in question may differ according to the intended use of the precipitate compound. Accordingly, it is preferable to select a washing fluid suitably according to the intended use and solubility of the precipitate. From this point of view, the washing fluid used in the present invention may comprise, for example, at least one aqueous solution selected from the group consisting of an aqueous solution of ammonium nitrate, an aqueous solution of ammonium chloride, and an aqueous solution of ammonium sulfate.

No particular limitation is placed on the washing method. Usable washing methods include, for example, dispersion washing in which the crude precipitate or the precipitate is dispersed in a washing fluid and this dispersion is then subjected to solid-liquid separation, and passage washing in which a washing fluid is passed through the crude precipitate or the precipitate in the form of a cake. The washing may be carried out at a temperature ranging from 0° C. to 90° C. However, with consideration for the solubility of the precipitate and other factors, it is preferable to employ a temperature ranging from room temperature to 50° C. No particular limitation is placed on the state of the crude precipitate and the precipitate after washing, and they may be either in a wet state or in a dry state.

By employing the above-described washing method, the crude precipitate and the precipitate can be made highly pure without causing a substantial change in the average particle diameter thereof.

Specifically, the rate of change in the average particle diameter of the crude precipitate before and after washing can preferably be reduced to not greater than 50%, more preferably not greater than 40%, and most preferably not greater than 30%.

Moreover, the rate of change in the average particle diameter of the precipitate before and after washing can preferably be reduced to not greater than 50%, more preferably not greater than 40%, and most preferably not greater than 30%.

The term "rate of change in average particle diameter" as used herein means a value defined by $100 \times |r-r'|/r$ in which r is the average particle diameter before washing and r' is the average particle diameter after washing.

By employing the above-described washing method, the amount of chlorine contained in the washed precipitate obtained by washing the precipitate obtained in the second step can preferably be reduced to not greater than 0.10 mole, more preferably not greater than 0.05 mole, and most preferably not greater than 0.03 mole, per mole of the element A.

Moreover, the amount of sodium contained in the washed precipitate obtained by washing the precipitate obtained in the second step can preferably be reduced to not greater than 0.10 mole, more preferably not greater than 0.05 mole, and most preferably not greater than 0.03 mole, per mole of the element A.

One example of the molybdenum-based precipitate washed in the above-described steps comprises a precipitate obtained by recovering a molybdenum-based catalyst having been used for any of various reactions (also referred to as "used catalyst") and forming it into a precipitate according to a suitable procedure. In such a case, a used molybdenum-based catalyst whose activity has been reduced as a result of long-term use may be recovered, formed into a precipitate, and washed according to the method of the present invention. Thereafter, it may be replenished with one or more necessary metallic elements. Thus, it is possible to prepare a reactivated molybdenum-based catalyst or a molybdenum-based catalyst having different reaction characteristics and other characteristics as compared with that before being recovered.

Another example of the molybdenum-based precipitate comprises a precipitate obtained by preparing a solution containing at least molybdate ion, an oxoacid ion containing the element A, and other metallic acid ions as required, and adjusting the pH of the solution to 6.5 or less.

After a molybdenum-based precipitate having a desired average particle diameter is prepared according to the above-described washing method, a molybdenum-based catalyst may be prepared by subjecting the molybdenum-based precipitate to a subsequent step for enhancing its catalytic activity (for example, adding thereto one or more metallic elements depending on the reaction system).

The above-described washing method is suitable for the purpose of washing the crude precipitate obtained in the first step and the precipitate obtained in the second step. However, it is to be understood that its use is not limited thereto. That is, the above-described washing method can be applied to any precipitate containing at least molybdenum and the element A, irrespective of its preparation process.

The present invention is more fully explained with reference to the following specific examples. However, these examples are not to be construed to limit the scope of the invention. As to the reagents, commercially available products of high purity were used unless otherwise specified.

Analytical Methods

The quantitative analysis of constituent elements (or molecules) was carried out by ICP emission spectrometry (using CID High-frequency Plasma Emission Spectroscopic Analyzer, IRIS Advantage IP, manufactured by Nippon Jarrell-Ash Co., Ltd.), atomic absorption spectrometry (using SAS7500, manufactured by Seiko Instruments Inc.), ion chromatography (using DX-AQ2211, manufactured by Nippon Dionex Co., Ltd.), and the Kjeldahl method.

The average particle diameter of a precipitate was determined by measuring its particle size distribution with an SK LASER MICRON SIZER PRO-7000 (manufactured by Seishin Enterprise Co., Ltd.) and finding a particle diameter at which the cumulative frequency was equal to 50%.

EXAMPLE 1

(a) Use of a Molybdenum-based catalyst: A tubular reactor was charged with a catalyst containing 34.54 parts by mass of molybdenum, 0.93 part by mass of phosphorus, 1.41 parts by mass of potassium, 0.76 part by mass of vanadium, and 0.57 part by mass of copper and having the composition of $P_1Mo_{12}K_{1.2}V_{0.5}Cu_{0.3}$, exclusive of oxygen (the same shall apply hereinafter). Then, a gaseous mixture composed of 5% by volume of methacrolein, 10% by volume of oxygen, 30% by volume of water vapor, and 55% by volume of nitrogen was reacted for 2,000 hours under reaction conditions including a reaction temperature of 270° C. and a contact time of 3.6 seconds.

(b) Removal of potassium: After completion of the reaction, the catalyst was removed from the tubular reactor, and 91 parts by mass of this used catalyst was dispersed in 400 parts by mass of pure water. After 89.2 parts by mass of a 45% aqueous solution of sodium hydroxide was added thereto and the resulting mixture was stirred for 2 hours, the residue was filtered off. The filtrate was freed of potassium by passing it through a strongly acid Na-type styrene-based ion-exchange resin (Amberlite IR-120B, manufactured by Organo Corp.) at a space velocity (SV) of 1.

(c) First step: After the pH of the effluent fluid was adjusted to 8.9 by the addition of 29.9 parts by mass of 36% hydrochloric acid, 19.25 parts by mass of ammonium chloride (i.e., 12.0 moles of ammonium root per mole of phosphorus) was added thereto. Then, 84.1 parts by mass of 36% hydrochloric acid was added thereto, with stirring, so as to adjust the pH of the mixture to 1.0. As the pH became lower by the addition of hydrochloric acid, a crude precipitate was formed. When the pH of the mixture reached 1.0, it was in the form of a slurry. Thereafter, the slurry was kept at room temperature for 2 hours with stirring. The resulting slurry containing the crude precipitate was filtered with a Nutsche type vacuum filter to obtain a wet crude precipitate.

(d) Washing step: The wet crude precipitate thus obtained was dispersed in 2 parts by mass of a 2% aqueous solution of ammonium nitrate (having a pH of 5.2 at room temperature and containing 0.25 mole/L of ammonium root) and kept in the dispersed state for 5 minutes. The dispersion was filtered again with a Nutsche type vacuum filter to obtain 120.5 parts by mass of a wet crude precipitate.

(e) Second step: The wet crude precipitate thus obtained was added to 500 parts by mass of pure water. After 71.1 parts by mass of 25% aqueous ammonia was added thereto, the resulting mixture was kept for 10 minutes with stirring. Initially, the mixture was in the form of a slurry, but became a perfect solution after 5 minutes. At that time, its pH was 8.6. Then, after the temperature of the solution was raised to 70° C., 99.8 parts by mass of 36% hydrochloric acid was added thereto so as to adjust the pH of the mixture to 5.0. This mixture was kept at 80° C. for 3 hours with stirring to form a precipitate. After the slurry containing the precipitate was cooled to room temperature, it was filtered to obtain a wet precipitate.

(f) Washing step: Next, the wet precipitate was dispersed in and washed with 2 parts by mass of a 2% aqueous solution of ammonium nitrate (having a pH of 5.2 at room temperature and containing 0.25 mole/L of ammonium root). After this procedure was repeated twice, the dispersion was filtered. Finally, 110.5 parts by mass of a wet precipitate was obtained. This wet precipitate contained 30.55 parts by mass (12 atm. %) of molybdenum, 0.90 part by mass (1.1 atm. %) of phosphorus, and 0.61 part by mass (0.45 atm. %) of vanadium; 11.51 moles of ammonium root per mole of phosphorus; and impurities such as 0.01 mole of sodium and 0.02 mole of chlorine, per mole of phosphorus.

When the wet precipitate was dispersed in the filtrate from which the wet precipitate had been separated in "(e) Second step", and used for the measurement of its average particle diameter, it was found to be 11.5 μm.

From the above-described results, it has been found that, by employing a process including the first and second step in accordance with the present invention, a molybdenum-based precipitate containing three or more metallic elements and having good characteristics can be prepared with good workability.

Moreover, it has been found that a molybdenum-based precipitate can also be satisfactorily prepared when the potassium contained in the above molybdenum-based precipitate is replaced by sodium.

EXAMPLE 2

125.1 parts by mass of a wet precipitate was obtained in the same manner as described in Example 1, (a) to (d). This wet precipitate contained 32.54 parts by mass of molybdenum, 0.91 parts by mass of phosphorus, and 0.66 part by mass of vanadium; 10.71 moles of ammonium root per mole of phosphorus; and impurities such as 0.21 mole of sodium and 0.15 mole of chlorine, per mole of phosphorus.

Subsequently, without carrying out the second step, the wet precipitate was dispersed in and washed with a 2% aqueous solution of ammonium nitrate. This procedure was repeated three times [a total of four times, including the step of (d)]. For the respective washing steps, the amount of residual sodium per mole of phosphorus decreased to 0.13 mole, 0.11 mole and 0.11 mole. However, no appreciable decrease in residual sodium was noted in and after the third washing step. Similarly, the amount of residual chlorine per mole of phosphorus decreased to 0.12 mole, 0.09 mole and 0.09 mole. However, no appreciable decrease in residual chlorine was noted in and after the third washing step.

EXAMPLE 3

(a) Use of a Molybdenum-based catalyst: A tubular reactor was charged with a catalyst containing 34.54 parts by mass of molybdenum, 0.93 part by mass of phosphorus, 1.41 parts by mass of potassium, 0.76 part by mass of vanadium, 0.57 part by mass of copper, and 1.12 parts by mass of arsenic, and having the composition of $P_1Mo_{12}V_{0.5}As_{0.5}Cu_{0.3}K_{1.2}$. Then, a gaseous mixture composed of 5% by volume of methacrolein, 10% by volume of oxygen, 30% by volume of water vapor, and 55% by volume of nitrogen was reacted for 2,000 hours under reaction conditions including a reaction temperature of 270° C. and a contact time of 3.6 seconds.

(b) First step: After completion of the reaction, the catalyst was removed from the tubular reactor, and 94 parts by mass of this used catalyst was dispersed in 400 parts by mass of pure water. After 89.0 parts by mass of a 45% aqueous solution of sodium hydroxide was added thereto and the resulting mixture was stirred for 1 hour, the residue was filtered off. After 29.8 parts by mass of 36% hydrochloric acid was added thereto so as to adjust the pH of the solution to 9.0, 28.90 parts by mass (i.e., 12.0 moles of ammonium root per mole of the combined amount of phosphorus and arsenic) of ammonium chloride was added thereto. Then, 48.0 parts by mass of 36% hydrochloric acid was added thereto so as to adjust the pH of the mixture to 5.0, and this mixture was kept at 60° C. for 3 hours with stirring. After this mixture was cooled to room temperature, it was filtered with a Nutsche type vacuum filter to obtain a wet crude precipitate.

(c) Washing step: The wet crude precipitate thus obtained was dispersed in 2 parts by mass of a 2% aqueous solution of ammonium nitrate (having a pH of 5.2 at room temperature and containing 0.25 mole/L of ammonium root) and kept in the dispersed state for 5 minutes. The dispersion was filtered to obtain 90 parts by mass of a wet crude precipitate.

(d) Second step: The wet crude precipitate thus obtained was added to 500 parts by mass of pure water. After 55.5 parts by mass of 25% aqueous ammonia was added thereto, the resulting mixture was kept for 10 minutes with stirring. At that time, its pH was 8.7. Then, 78.1 parts by mass of 36% hydrochloric acid was added thereto so as to adjust the pH of the mixture to 5.0, and this mixture was kept at 60° C. for 3 hours with stirring. After this mixture was cooled to room temperature, it was filtered to obtain a wet precipitate.

(e) Washing step: The wet precipitate thus obtained was dispersed in and washed with 2 parts by mass of a 2% aqueous solution of ammonium nitrate (having a pH of 5.2 at room temperature and containing 0.25 mole/L of ammonium root). This procedure was repeated twice. Finally, 83 parts by mass of a wet precipitate was obtained. This wet precipitate contained 24.11 parts by mass (12 atm. %) of molybdenum, 0.56 part by mass (0.86 atm. %) of phosphorus, 0.56 part by mass (0.69 atm. %) of potassium, 0.36 part by mass (0.34 atm. %) of vanadium, and 1.12 parts by mass (0.71 atm. %) of arsenic; 9.42 moles of ammonium root per mole of phosphorus; and impurities such as 0.01 mole of sodium and 0.02 mole of chlorine, per mole of the combined amount of phosphorus and arsenic.

When the wet precipitate was dispersed in the filtrate from which the wet precipitate had been separated in "(d) Second step", and used for the measurement of its average particle diameter, it was found to be 16.2 μm.

From the above-described results, it has been found that, by employing a process including the first and second step in accordance with the present invention, a molybdenum-based precipitate containing three or more metallic elements and having good characteristics can be prepared with good workability.

EXAMPLE 4

(a) First step: 94 parts by mass of a used catalyst having the same composition as that of Example 3 was dispersed in 400 parts by mass of pure water. After 89.0 parts by mass of a 45% aqueous solution of sodium hydroxide was added thereto and the resulting mixture was stirred for 1 hour, the residue was filtered off. Subsequently, in place of-ammonium chloride, 640 parts by mass of the filtrate obtained in the second step of Example 3 (containing 11 moles of ammonium root per mole of the combined amount of phosphorus and arsenic contained in the solution prior to the addition of the filtrate) was added thereto. Then, 51.2 parts by mass of 36% hydrochloric acid was added thereto so as to adjust the pH of the mixture to 5.0, and this mixture was kept at 60° C. for 3 hours with stirring. After this mixture was cooled to room temperature, it was filtered in the same manner as in Example 3 to obtain a wet crude precipitate.

(b) Washing step: Next, the wet crude precipitate was dispersed in and washed with 2 parts by mass of a 2% aqueous solution of ammonium nitrate (having a pH of 5.2 at room temperature and containing 0.25 mole/L of ammonium root). Thus, there was obtained 95 parts by mass of a wet crude precipitate.

(c) Second step: The wet crude precipitate thus obtained was added to 500 parts by mass of pure water. After 57.5 parts by mass of 25% aqueous ammonia was added thereto, the resulting mixture was kept for 10 minutes with stirring. Then, 78.1 parts by mass of 36% hydrochloric acid was added thereto so as to adjust the pH of the mixture to 5.0, and this mixture was kept at 60° C. for 3 hours with stirring. After this mixture was cooled to room temperature, it was filtered to obtain a wet precipitate.

(d) Washing step: The wet precipitate thus obtained was dispersed in and washed with 2 parts by mass of a 2% aqueous solution of ammonium nitrate (having a pH of 5.2 at room temperature and containing 0.25 mole/L of ammonium root). This procedure was repeated twice. Finally, 89.7 parts by mass of a wet precipitate was obtained. This wet precipitate contained 25.34 parts by mass (12 atm. %) of molybdenum, 0.57 part by mass (0.84 atm. %) of phosphorus, 0.56 part by mass (0.65 atm. %) of potassium, 0.38 part by mass (0.34 atm. %) of vanadium, and 1.12 parts by mass (0.68 atm. %) of arsenic; 9.31 moles of ammonium root per mole of phosphorus; and impurities such as 0.006 mole of sodium and 0.02 mole of chlorine, per mole of the combined amount of phosphorus and arsenic.

When the wet precipitate was dispersed in the filtrate from which the wet precipitate had been separated in "(c) Second step", and used for the measurement of its average particle diameter, it was found to be 17.8 μm.

From the above-described results, it has been found that, by employing a process including the first and second step in accordance with the present invention, a molybdenum-based precipitate containing three or more metallic elements and having good characteristics can be prepared with good workability.

It has also been found that the filtrate obtained in the second step can be used in the first step.

EXAMPLE 5

95 parts by mass of a wet precipitate was obtained in the same manner as described in Example 3, (a) to (c). This wet precipitate contained 26.16 parts by mass of molybdenum, 0.57 part by mass of phosphorus, 0.58 part by mass of potassium, 0.37 part by mass of vanadium, and 1.12 parts by mass of arsenic; 9.51 moles of ammonium root per mole of phosphorus; and impurities such as 1.20 moles of sodium and 1.12 moles of chlorine, per mole of phosphorus.

Subsequently, without carrying out the second step, the wet precipitate was dispersed in and washed with a 2% aqueous solution of ammonium nitrate. This procedure was repeated five times. When the finally obtained wet precipitate was analyzed, the amounts of residual sodium and residual chlorine per mole of the combined amount of phosphorus and arsenic were 0.06 mole and 0.05 mole, respectively.

EXAMPLE 6

(a) Preparation of a molybdenum-based precipitate: 63.62 parts by mass of ammonium paramolybdate, 1.05 parts by mass of ammonium metavanadate, and 7.61 parts by mass of cesium nitrate were dissolved in 300 parts by mass of pure water at 70° C. After a solution prepared by dissolving 3.46 parts by mass of 85% phosphoric acid in 10 parts by mass of pure water was added thereto, 46.1 parts by mass of 36% hydrochloric acid was added thereto so as to adjust the pH of the mixture to 2.5, and its temperature was raised to 95° C. with stirring. Then, a solution prepared by dissolving 1.45 parts by mass of copper nitrate in 10 parts by mass of pure water was added thereto, and this mixture was concentrated by heating with stirring until the specific gravity of the resulting slurry reached 1.4. Thereafter, the heating was discontinued and the slurry was cooled to room temperature. The resulting slurry containing a precipitate was filtered with a Nutsche type vacuum filter using No. 5C filter paper (manufactured by Advantech Japan Co., Ltd.) to obtain 62.5 parts by mass of a wet precipitate. This wet precipitate contained 30.15 parts by mass (12 atm. %) of molybdenum, 0.81 part by mass (1.0 atm. %) of phosphorus, 1.03 parts by mass (0.30 atm. %) of cesium, 0.02 part by mass (0.015 atm. %) of vanadium, and 0.30 part by mass (0.18 atm. %) of copper; 1.2 moles of ammonium root per mole of phosphorus; and impurities such as 1.1 moles of chlorine per mole of phosphorus. When this precipitate was dispersed in the filtrate obtained in the filtration step, and used for the measurement of its average particle diameter, it was found to be 18.1 μm.

(b) Washing of the molybdenum-based precipitate: The precipitate thus obtained was dispersed in 2 parts by mass of a 2% aqueous solution of ammonium nitrate (i.e., an aqueous solution prepared by dissolving reagent grade ammonium nitrate powder in pure water, which had a pH of 5.2 at room temperature and contained 0.25 mole/L of ammonium root) and kept in the dispersed state for 5 minutes. Then, the precipitate was collected by filtration with a Nutsche type vacuum filter. This dispersion washing procedure was repeated twice. When the precipitate having been washed twice was dispersed in the filtrate obtained in the first washing step, and used for the measurement of its particle diameter, the average particle diameter was found to be 15.5 $\mu$m (with a rate of change in average particle diameter of 14.4%). The amount of chlorine contained in the precipitate was 0.10 mole per mole of phosphorus.

From the above-described results, it has been found that, by washing a molybdenum-based precipitate with an acid aqueous solution having a pH of 6.5 or less and containing not less than 0.01 mole/L of ammonium root, the precipitate shows only a slight change in average particle diameter before and after washing, and contains only small amounts of residual impurities.

EXAMPLE 7

A precipitate was obtained under the same conditions as employed in Example 6. This precipitate was washed twice in exactly the same manner as in Example 6, except that a 0.5% aqueous solution of ammonium nitrate (having a pH of 5.6 at room temperature and containing 0.06 mole/L of ammonium root) was used as the washing fluid. After washing, the amount of chlorine contained in the wet precipitate was 0.10 mole per mole of phosphorus. When the precipitate was dispersed in the filtrate obtained in the first washing step, and used for the measurement of its average particle diameter, it was found to be 14.1 $\mu$m (with a rate of change in average particle diameter of 22.1%).

From the above-described results, it has been found that, by washing a molybdenum-based precipitate with an acid aqueous solution having a pH of 6.5 or less and containing not less than 0.01 mole/L of ammonium root, the precipitate shows only a slight change in average particle diameter before and after washing, and contains only small amounts of residual impurities.

EXAMPLE 8

A precipitate was obtained under the same conditions as employed in Example 6. This precipitate was washed twice in exactly the same manner as in Example 6, except that pure water was used as the washing fluid. After washing, the amount of chlorine contained in the wet precipitate was 0.14 mole per mole of phosphorus, but the average particle diameter of the precipitate was 4.5 $\mu$m (with a rate of change in average particle diameter of 75.1%). This caused an extreme degradation in filterability and the passage of the precipitate into the filtrate occurred.

EXAMPLE 9

(a) Preparation of a molybdenum-based precipitate: 63.52 parts by mass of ammonium paramolybdate, and 7.61 parts by mass of cesium nitrate were added to 300 parts by mass of pure water, followed by the addition of 3.46 parts by mass of 85% phosphoric acid. Subsequently, 70.2 parts by mass of 25% aqueous ammonia (i.e., 34.2 moles of ammonium root per mole of phosphorus) added thereto with stirring, followed by heating to 35° C. Then, 109.1 parts by mass of 36% hydrochloric acid was added dropwise thereto so as to adjust the pH of the mixture to 2.0. After pH adjustment, the mixture was kept for 2 hours with stirring and then cooled to room temperature. The resulting slurry containing a precipitate was filtered with a Nutsche type vacuum filter using No. 5C filter paper (manufactured by Advantech Japan Co., Ltd.) to obtain 110.5 parts by mass of a wet precipitate. When this precipitate was dispersed in the filtrate obtained in the first filtration step, and used for the measurement of its particle diameter, the average particle diameter was found to be 11.5 $\mu$m. This wet precipitate contained 33.91 parts by mass (12 atm. %) of molybdenum, 0.93 part by mass (1.0 atm. %) of phosphorus, and 5.11 parts by mass (1.3 atm. %) of cesium; 2.40 moles of ammonium root per mole of phosphorus; and impurities such as 0.20 mole of chlorine per mole of phosphorus.

(b) Washing of the molybdenum-based precipitate: The precipitate thus obtained was dispersed in 2 parts by mass of a 2% aqueous solution of ammonium nitrate (having a pH of 5.2 at room temperature and containing 0.25 mole/L of ammonium root). After this dispersion was stirred for 5 minutes, the precipitate was collected by filtration with a Nutsche type vacuum filter. This washing procedure was repeated twice. When the precipitate having been washed was dispersed in the filtrate obtained in the first washing step, and used for the measurement of its average particle diameter, it was found to be 10.1 $\mu$m (with a rate of change in average particle diameter of 12.2%). This precipitate contained 0.11 mole per mole of phosphorus.

From the above-described results, it has been found that, by washing a molybdenum-based precipitate with an acid aqueous solution having a pH of 6.5 or less and containing not less than 0.01 mole/L of ammonium root, the precipitate shows only a slight change in average particle diameter before and after washing, and contains only small amounts of residual impurities.

EXAMPLE 10

A precipitate was obtained under the same conditions as employed in Example 9. This precipitate was washed twice in exactly the same manner as in Example 9, except that a 1.0% aqueous solution of ammonium nitrate (having a pH of 5.4 at room temperature and containing 0.13 mole/L of ammonium root) was used as the washing fluid. When the wet precipitate having been washed was dispersed in the filtrate obtained in the first washing step, and used for the measurement of its average particle diameter, it was found to be 9.8 $\mu$m (with a rate of change in average particle diameter of 14.8%). The amount of chlorine contained in the precipitate was 0.10 mole per mole of phosphorus.

From the above-described results, it has been found that, by washing a molybdenum-based precipitate with an acid aqueous solution having a pH of 6.5 or less and containing not less than 0.01 mole/L of ammonium root, the precipitate shows only a slight change in average particle diameter before and after washing, and contains only small amounts of residual impurities.

EXAMPLE 11

A precipitate was obtained under the same conditions as employed in Example 9. This precipitate was washed twice in exactly the same manner as in Example 9, except that pure water was used as the washing fluid. After washing, the amount of chlorine contained in the precipitate was 0.18 mole per mole of phosphorus, and the average particle diameter of the precipitate was 2.2 $\mu$m (with a rate of change in average particle diameter of 80.9%). The times required for precipitation after dispersion washing and for the filtration of washing fluid were about ten times longer as compared with the case in which a 2% aqueous solution of ammonium nitrate was used as the washing fluid, and the passage of the precipitate into the filtrate occurred.

EXAMPLE 12

A precipitate was obtained under the same conditions as employed in Example 9. This precipitate was washed twice in exactly the same manner as in Example 9, except that a 1% aqueous solution of nitric acid was used as the washing fluid. After washing, the amount of chlorine contained in the precipitate was 0.13 mole per mole of phosphorus, and the average particle diameter of the precipitate was 4.2 $\mu$m (with a rate of change in average particle diameter of 63.5%). In this case, the precipitate had extremely poor filterability and the passage of the precipitate into the filtrate occurred.

EXAMPLE 13

(a) Use of a molybdenum-based catalyst: A tubular reactor was charged with a catalyst containing 34.54 parts by mass of molybdenum, 0.93 part by mass of phosphorus, 1.41 parts by mass of potassium, 0.76 part by mass of vanadium, and 0.57 part by mass of copper and having the composition of $P_1Mo_{12}K_{1.2}V_{0.5}Cu_{0.3}$, exclusive of oxygen (the same shall apply hereinafter). Then, a gaseous mixture composed of 5% by volume of methacrolein, 10% by volume of oxygen, 30% by volume of water vapor, and 55% by volume of nitrogen was reacted for 2,000 hours under reaction conditions including a reaction temperature of 270° C. and a contact time of 3.6 seconds.

(b) Preparation of a molybdenum-based precipitate: After completion of the reaction, the catalyst was removed from the tubular reactor, and 91 parts by mass of this used catalyst was dispersed in 400 parts by mass of pure water. After 89.0 parts by mass of a 45% aqueous solution of sodium hydroxide was added thereto and the resulting mixture was stirred for 1 hour, the residue was filtered off. The filtrate was freed of potassium by passing it through a strongly acid Na-type styrene-based ion-exchange resin (Amberlite IR-120B, manufactured by Organo Corp.) at a space velocity (SV) of 1. After the pH of the effluent fluid was adjusted to 9.0 by the addition of 29.0 parts by mass of 36% hydrochloric acid, 19.25 parts by mass of ammonium chloride (i.e., 12.0 moles of ammonium root per mole of phosphorus) was added thereto. Then, 89.2 parts by mass of 36% hydrochloric acid was added thereto so as to adjust the pH of the solution to 1.0, and this solution was kept at 25° C. for 3 hours with stirring. The resulting slurry containing a precipitate was filtered with a Nutsche type vacuum filter using No. 5C filter paper (manufactured by Advantech Japan Co., Ltd.) to obtain 125.5 parts by mass of a wet precipitate. This wet precipitate contained 31.91 parts by mass (12 atm. %) of molybdenum, 0.91 part by mass (1.1 atm. %) of phosphorus, and 0.66 part by mass (0.47 atm. %) of vanadium; 5.52 moles of ammonium root per mole of phosphorus; and impurities such as 1.20 moles of chlorine and 1.13 moles of sodium, per mole of phosphorus. When this precipitate was dispersed in the filtrate obtained in the first filtration step, and used for the measurement of its particle diameter, the average particle diameter was found to be 9.8 $\mu$m.

(c) Washing of the molybdenum-based precipitate: The precipitate thus obtained was dispersed in 2 parts by mass of a 2% aqueous solution of ammonium nitrate (having a pH of 5.2 at room temperature and containing 0.25 mole/L of ammonium root). After this dispersion was stirred for 5 minutes, the precipitate was collected by filtration with a Nutsche type vacuum filter. This dispersion washing procedure was repeated twice. When the precipitate having been washed was dispersed in the filtrate obtained in the first washing step, and used for the measurement of its particle diameter, the average particle diameter was found to be 8.5 $\mu$m (with a rate of change in average particle diameter of 13.3%). This precipitate contained 0.10 mole of sodium and 0.10 mole of chlorine, per mole of phosphorus.

From the above-described results, it has been found that, by washing a molybdenum-based precipitate with an acid aqueous solution having a pH of 6.5 or less and containing not less than 0.01 mole/L of ammonium root, the precipitate shows only a slight change in average particle diameter before and after washing, and contains only small amounts of residual impurities.

Moreover, it has been found that a molybdenum-based precipitate can also be satisfactorily washed when the potassium contained in the above molybdenum-based precipitate is replaced by sodium.

EXAMPLE 14

A precipitate was obtained under the same conditions as employed in Example 13. This precipitate was washed in the same manner as in Example 13, except that the 2% aqueous solution of ammonium nitrate was replaced by a 2% aqueous solution of ammonium chloride (having a pH of 5.3 at room temperature and containing 0.37 mole/L of ammonium root). When the wet precipitate having been washed was dispersed in the filtrate obtained in the first filtration step, and used for the measurement of its average particle diameter, it was found to be 8.5 $\mu$m (with a rate of change in average particle diameter of 13.3%). The amount of sodium contained in this precipitate was 0.09 mole per mole of phosphorus.

From the above-described results, it has been found that sodium can be reduced by using an aqueous solution of ammonium chloride.

EXAMPLE 15

A precipitate was obtained under the same conditions as employed in Example 13. This precipitate was washed twice in exactly the same manner as in Example 13, except that pure water was used as the washing fluid. When the wet precipitate having been washed was dispersed in the filtrate obtained in the first filtration step, and used for the measurement of its average particle diameter, it was found to be 3.1 $\mu$m (with a rate of change in average particle diameter of 68.4%). This precipitate contained 0.12 mole of sodium and 0.16 mole of chlorine, per mole of phosphorus. After washing, the precipitate had extremely poor filterability and the passage of the precipitate into the filtrate occurred.

EXAMPLE 16

(a) Preparation of a molybdenum-based precipitate: A catalyst containing 34.54 parts by mass of molybdenum, 0.93 part by mass of phosphorus, 5.18 parts by mass of cesium, and 1.12 parts by mass of arsenic and having the composition of $P_1Mo_{12}As_{0.5}Cs_{1.3}$ was used for 2,000 hours under the same reaction conditions as in Example 13. 89 parts by mass of this used catalyst was dispersed in 400 parts by mass of pure water. After 89.0 parts by mass of a 45% aqueous solution of sodium hydroxide was added thereto and the resulting mixture was stirred for 3 hours, a small amount of undissolved matter was filtered off to obtain a homogeneous solution. After the pH of the solution was adjusted to 7.5 by the addition of 33.5 parts by mass of 36% hydrochloric acid, 28.90 parts by mass of ammonium chloride (i.e., 12.0 moles of ammonium root per mole of the combined amount of phosphorus and arsenic) was added thereto. Then, 56.7 parts by mass of 36% hydrochloric acid was added thereto so as to adjust the pH of the solution to 4.0, and this solution was kept at 60° C. for 3 hours with stirring. The resulting slurry containing a precipitate was filtered with a Nutsche type vacuum filter using No. 5C filter paper (manufactured by Advantech Japan Co., Ltd.) to obtain 78.5 parts by mass of a wet precipitate. This wet precipitate contained 26.95 parts by mass (12 atm. %) of molybdenum, 0.51 part by mass (0.71 atm. %) of phosphorus, 1.12 parts by mass (0.64 atm. %) of phosphorus, and 5.10 parts by mass (1.6 atm. %) of cesium; 9.52 moles of ammonium root per mole of phosphorus; and impurities such as 0.93 mole of chlorine and 0.76 mole of sodium, per mole of the combined amount of phosphorus and arsenic. When this precipitate was dispersed in the filtrate obtained in the first filtration step, and used for the measurement of its particle diameter, the average particle diameter was found to be 18.5 μm.

(b) Washing of the molybdenum-based precipitate: The precipitate thus obtained was dispersed in 2 parts by mass of a 2% aqueous solution of ammonium nitrate (having a pH of 5.2 at room temperature and containing 0.25 mole/L of ammonium root). After this dispersion was stirred for 5 minutes, the precipitate was collected by filtration with a Nutsche type vacuum filter. This washing procedure was repeated twice. When the precipitate having been washed was dispersed in the filtrate obtained in the first washing step, and used for the measurement of its particle diameter, the average particle diameter was found to be 16.8 μm (with a rate of change in average particle diameter of 9.2%). This precipitate contained 0.06 mole of sodium and 0.05 mole of chlorine, per mole of the combined amount of phosphorus and arsenic.

From the above-described results, it has been found that, by washing a molybdenum-based precipitate with an acid aqueous solution having a pH of 6.5 or less and containing not less than 0.01 mole/L of ammonium root, the precipitate shows only a slight change in average particle diameter before and after washing, and contains only small amounts of residual impurities.

EXAMPLE 17

A precipitate was obtained under the same conditions as employed in Example 16. This precipitate was washed twice in the same manner as in Example 16, except that a 2% aqueous solution of ammonium sulfate (having a pH of 6.0 at room temperature and containing 0.30 mole/L of ammonium root) was used as the washing fluid. When the wet precipitate having been washed was dispersed in the filtrate obtained in the first filtration step, and used for the measurement of its average particle diameter, it was found to be 15.5 μm (with a rate of change in average particle diameter of 16.2%). This precipitate contained 0.07 mole of sodium and 0.05 mole of chlorine, per mole of the combined amount of phosphorus and arsenic.

EXAMPLE 18

A precipitate was obtained under the same conditions as employed in Example 16. This precipitate was washed twice in the same manner as in Example 16, except that pure water was used as the washing fluid. The average particle diameter of the precipitate was found to be 4.6 μm (with a rate of change in average particle diameter of 75.1%). After washing, the precipitate had extremely poor filterability and the passage of the precipitate into the filtrate occurred.

Exploitability in Industry

It is evident from the above description that, by employing a preparation process including at least the first step of forming a crude precipitate by pH adjustment to 6.5 or less in the presence of an alkali metal compound and the second step of dissolving the crude precipitate in aqueous ammonia and forming a precipitate by pH adjustment to 6.5 or less, a molybdenum-based precipitate having a high purity and a desired average particle diameter can be conveniently prepared with good workability, even when the molybdenum-based precipitate contains three or more metallic elements.

Moreover, by washing a molybdenum-based precipitate with an acid aqueous solution having a pH of 6.5 or less and containing not less than 0.01 mole/L of ammonium root, a change in the average particle diameter of the molybdenum-based precipitate can be suppressed and, moreover, the molybdenum-based precipitate can be conveniently washed with good workability. Thus, there can be obtained a molybdenum-based precipitate having a high purity and a desired average particle diameter. Furthermore, a molybdenum-based precipitate containing three or more metallic elements can also be washed satisfactorily.

What is claimed is:

1. A process for preparing a precipitate comprising at least molybdenum and an element A; wherein A is selected from the group consisting of phosphorus, arsenic, and mixtures thereof; which comprises sequentially:

adjusting the pH of the fluid mixture comprising at least alkali metal compound, molybdenum and the element A to 6.5 or less thereby obtaining a crude precipitate;

filtering the crude precipitate;

dissolving the crude precipitate in a solution comprising aqueous ammonia;

adjusting the pH of the solution to 6.5 or less thereby obtaining a precipitate; and filtering the precipitate.

2. A process for the preparation of the precipitate as claimed in claim 1, which further comprises:

separately washing the crude precipitate and the precipitate with an aqueous solution having a pH of 6.5 or less and comprising at least 0.01 mol/L of an ammonium ion.

3. A process for the preparation of the precipitate as claimed in claim 2, wherein the precipitate subsequent to washing comprises a chlorine content less than 0.01 mole per mole of element A.

4. A process for the preparation of the precipitate as claimed in claim 2, wherein the precipitate subsequent to washing comprises a sodium content less than 0.01 mole per mole of element A.

5. A process for the preparation of the precipitate as claimed in claim 1, wherein the fluid mixture further comprises an element, which is selected from the group consisting of potassium, rubidium, cesium, and mixtures thereof; and wherein the process further comprises removing said element from the fluid mixture.

6. A process for the preparation of the precipitate as claimed in claim 1, wherein the fluid mixture is obtained by:

dispersing a material comprising at least molybdenum, the element A, and an element Z in water;

wherein Z is an element selected from the group consisting of potassium, rubidium, cesium, and mixtures thereof; and adding at least one alkali metal compound and an aqueous ammonia solution.

7. A process for the preparation of the precipitate as claimed in claim 6, wherein the material is obtained subsequent to using a catalyst for the production of methacrylic acid by an oxidation of methacrolein.

8. A process for the preparation of a precipitate comprising at least molybdenum and an element A; wherein A is selected from the group consisting of phosphorus, arsenic, and mixtures thereof; which comprises:

washing the precipitate with an acidic aqueous solution having a pH of 6.5 or less and comprising at least 0.01 mol/L of an ammonium ion.

9. A process for the preparation of the precipitate as claimed in claim 8, wherein the precipitate is obtained from a material that comprises at least molybdenum, the element A, and an element Z; wherein Z is selected from the group consisting of potassium, rubidium, cesium, and mixtures thereof.

10. A process for the preparation of the precipitate as claimed in claim 9, wherein the material is obtained subsequent to using a catalyst for the production of methacrylic acid by an oxidation of methacrolein.

11. A process for the preparation of a molybdenum-based catalyst represented by formula (1):

$$A_a Mo_b V_c Cu_d D_e Y_f Z_g O_h \qquad (1)$$

wherein A is selected from the group consisting of phosphorus, arsenic, and mixtures thereof;

D is selected from the group consisting of antimony, bismuth, germanium, zirconium, tellurium, silver, selenium, silicon, tungsten, boron, and mixtures thereof;

Y is selected from the group consisting of iron, zinc, chromium, magnesium, tantalum, manganese, cobalt, barium, gallium, cerium, lanthanum, and mixtures thereof;

Z is selected from the group consisting of potassium, rubidium, cesium, and mixtures thereof;

a ranges from 0.5 to 3, b is equal to 12, c ranges from 0 to 3, d ranges from 0 to 3, e ranges from 0 to 3, f ranges from 0 to 3, and h is the atomic ratio of oxygen required to meet the valence of each element, the process comprising:

adjusting the pH of the fluid mixture comprising at least alkali metal compound, molybdenum and the element A to 6.5 or less thereby obtaining a crude precipitate; and filtering the crude precipitate;

dissolving the crude precipitate in aqueous ammonia to yield a solution and adjusting the pH of the resulting solution to 6.5 or less; thereby obtaining the precipitate; and filtering the precipitate; and then preparing a catalyst from the precipitate or from the precipitate and other raw materials.

12. A process for the preparation of the catalyst as claimed in claim 11, which further comprises:

separately washing the crude precipitate and the precipitate with an acidic aqueous solution having a pH of 6.5 or less and comprising at least 0.01 mol/L of an ammonium ion.

13. A process for the preparation of the catalyst as claimed in claim 11, which further comprises:

using a catalyst for the production of methacrylic acid by an oxidation of methacrolein.

* * * * *